(12) United States Patent
Lim et al.

(10) Patent No.: US 7,221,906 B2
(45) Date of Patent: May 22, 2007

(54) DISTRIBUTED MULTI-DROP BASE STATION/REPEATING UNIT USING EXTENSION OF ANALOG OPTICAL TRANSMISSION IN MOBILE COMMUNICATION SYSTEM

(75) Inventors: Sang Hoon Lim, Ichon-shi (KR); Se Hong Oh, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 503 days.

(21) Appl. No.: 10/400,013

(22) Filed: Mar. 26, 2003

(65) Prior Publication Data
US 2004/0137839 A1 Jul. 15, 2004

(30) Foreign Application Priority Data
Jan. 10, 2003 (KR) .................. 10-2003-0001719

(51) Int. Cl.
H04B 7/15 (2006.01)
(52) U.S. Cl. ............. 455/11.1; 455/446; 455/453; 455/574; 455/561; 398/116; 398/118
(58) Field of Classification Search ........... 455/11.1, 455/7, 446, 453, 422.1, 561, 560, 507, 574, 455/572; 398/115, 116, 118, 17, 19, 23
See application file for complete search history.

(56) References Cited

U.S. PATENT DOCUMENTS 5,400,391 A * 3/1995 Emura et al. ............. 455/422.1
6,337,754 B1 * 1/2002 Imajo .......................... 398/115
6,763,195 B1 * 7/2004 Willebrand et al. ......... 398/115
6,868,254 B2 * 3/2005 Weissman ................... 455/11.1
2002/0155836 A1 * 10/2002 Owens et al. ............... 455/445
2002/0187809 A1 * 12/2002 Mani et al. .................. 455/561
2005/0059387 A1 * 3/2005 Lardennois et al. ...... 455/422.1
2005/0074021 A1 * 4/2005 Bossemeyer et al. ....... 370/420

* cited by examiner

Primary Examiner—Edan Orgad
(74) Attorney, Agent, or Firm—McDonnell Boehnen Hulbert & Berghoff LLP (57) ABSTRACT

A distributed multi-drop base station/repeating unit using an extension of analog optical transmission in a mobile communication system. The base station unit comprises a main unit for performing functions of a mobile communication base station, and a plurality of remote units cascaded to the main unit on a sector basis. Each of the remote units is adapted to, in a forward mode, receive an analog optical signal, perform a photoelectric conversion operation for the received analog optical signal, split the resulting electrical RF signal into electrical RF signals of two paths, amplify the electrical RF signal of one of the two paths, perform an electrophotic conversion operation for the amplified electrical RF signal, transmit the resulting optical signal, amplify the electrical RF signal of the other path and transmit the amplified electrical RF signal to an associated terminal, and to, in a backward mode, receive an analog optical signal, perform the photoelectric conversion operation for the received analog optical signal, amplify the resulting electrical RF signal, couple the amplified electrical RF signal with its own electrical RF signal, perform the electrophotic conversion operation for the coupled result and transmit the resulting optical signal.

18 Claims, 6 Drawing Sheets

DISTRIBUTED MULTI-DROP BASE STATION/REPEATING UNIT USING EXTENSION OF ANALOG OPTICAL TRANSMISSION IN MOBILE COMMUNICATION SYSTEM

BACKGROUND OF THE INVENTION

1. Field of the Invention

The present invention relates to a distributed base station/repeating unit in a mobile communication system, and more particularly to a distributed multi-drop base station/repeating unit using an extension of analog optical transmission in a mobile communication system, wherein a larger number of remote units or repeaters are cascaded to a base station, which is a main unit, in such a manner that they minimize attenuation and loss of an optical signal, thereby enabling a mobile communication service to be more efficiently provided over a wider area.

2. Description of the Related Art

As well known to those skilled in the art, mobile communication service providers recognize the extension of base station service coverages of mobile communication systems as a very important factor from an economical or technical point of view. Note that base station service coverages are extended differently according to given environments such as a downtown area, rural district, etc., which have a great effect on base station installation and management costs. In this regard, mobile communication service providers are focusing their studies on a more efficient extension of base station service coverages.

In order to eliminate propagation shadow regions or extend base station service coverages, conventional mobile communication systems have employed methods using distributed base stations and methods using repeaters. The methods using repeaters may be roughly classified into a method using a microwave, a method using a radio frequency (RF) and a method using digital or analog optical transmission. A representative example of the methods using distributed base stations may be a method using digital or analog optical transmission. Because the present invention is applied to a scheme using analog optical transmission, a description will hereinafter be given of only a conventional technique using the optical transmission scheme.

Figure 1:
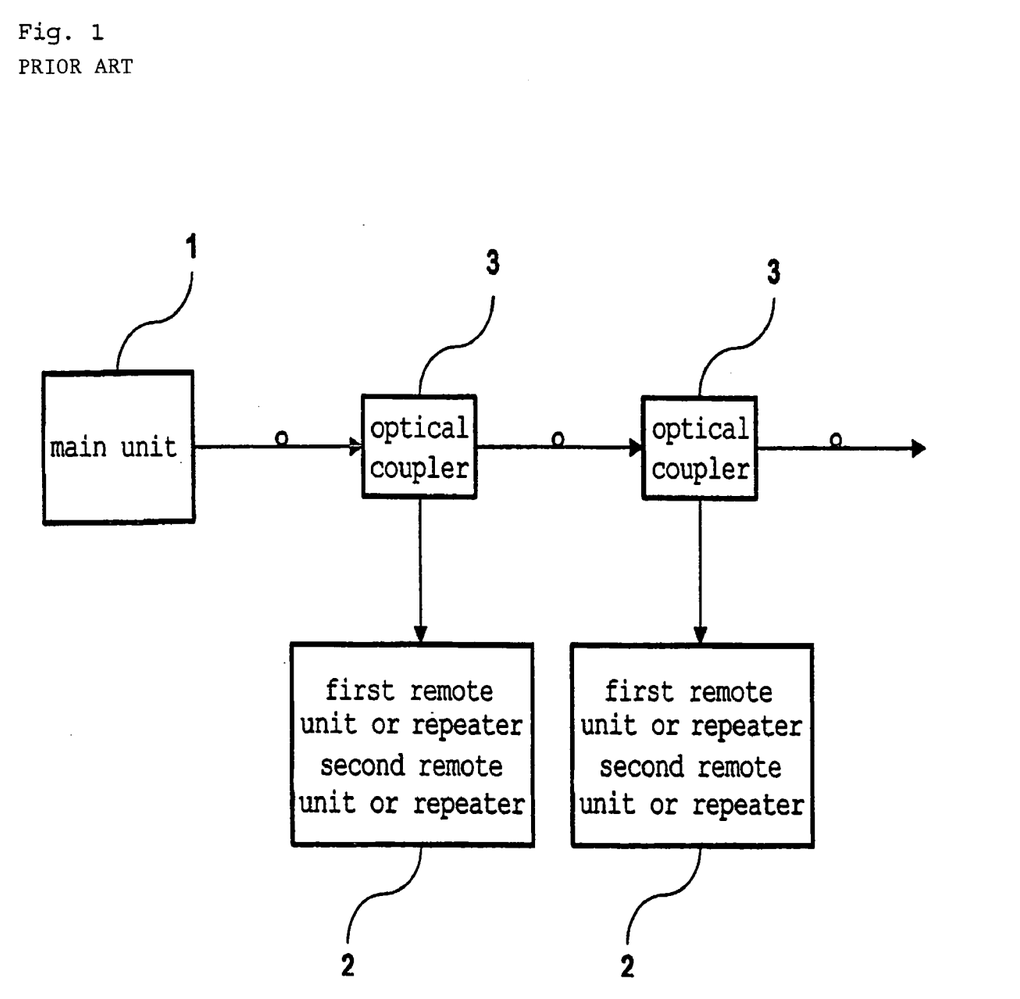
FIG. 1 is a functional block diagram showing the construction of a conventional distributed base station/repeating unit using analog optical transmission.

FIG. 1 is a functional block diagram showing the construction of a conventional distributed base station/repeating unit using analog optical transmission. As shown in this drawing, optical couplers 3 are used to cascade a plurality of remote units or repeaters 2 to a main unit 1, which is a base station, on a sector basis. A first one of the optical couplers 3 acts to receive an optical signal from the main unit 1, split the received optical signal into two signals and supply one of the two signals to a first one of the remote units or repeaters 2 at the same time that the other is supplied to a second one of the optical couplers 3 connected to a second one of the remote units or repeaters 2.

However, in the above-mentioned conventional distributed base station/repeating unit using analog optical transmission, an optical signal transmitted from the main unit is split by the optical couplers and then transferred to the remote units or repeaters, so it suffers severe attenuation. Besides, a transmission/reception noise figure resulting from an optical transducer and optical cable is so high as to degrade a reception characteristic. For this reason, optical transmission distances between the main unit and two or more remote units or repeaters are shortened, resulting in distance restrictions when the two or more remote units or repeaters are cascaded to the main unit. With the optical transmission distances between the main unit and the remote units or repeaters being shortened, a mobile communication service cannot be provided to a subscriber located at an out-of-the-way tourist resort or a seaside place far away from the main unit. In a mobile communication service provider's situation, a larger number of base stations, each of which is the main unit, must be installed, increasing an economic burden on the mobile communication service provider and, in turn, resulting in difficulty in technically managing the base stations.

SUMMARY OF THE INVENTION

Therefore, the present invention has been made in view of the above problems, and it is an object of the present invention to provide a distributed multi-drop base station/repeating unit using an extension of analog optical transmission in a mobile communication system, wherein a plurality of remote units or repeaters are cascaded to a main unit without limitations in extension distances between the main unit and the remote units or repeaters resulting from optical signal attenuation and transmission/reception noise, thereby improving the quality of a mobile communication service and promoting economical and technical improvements of the mobile communication system.

In accordance with one aspect of the present invention, the above and other objects can be accomplished by the provision of a distributed multi-drop base station unit using an extension of analog optical transmission in a mobile communication system, comprising: a main unit for performing functions of a mobile communication base station, the functions including a function of converting an analog radio frequency (RF) signal into an optical signal and transmitting the converted optical signal, a function of receiving an optical signal and converting the received optical signal into an analog RF signal, a modulation/demodulation function, an intermediate frequency (IF)/RF conversion function, and an encoding/decoding function; and a plurality of remote units cascaded to the main unit on a sector basis, each of the remote units being adapted to, in a forward mode, receive an analog optical signal, perform a photoelectric conversion operation for the received analog optical signal, split the resulting electrical RF signal into electrical RF signals of two paths, amplify the electrical RF signal of one of the two paths, perform an electrophotic conversion operation for the amplified electrical RF signal, transmit the resulting optical signal, amplify the electrical RF signal of the other path and transmit the amplified electrical RF signal to an associated terminal, and to, in a backward mode, receive an analog optical signal, perform the photoelectric conversion operation for the received analog optical signal, amplify the resulting electrical RF signal, couple the amplified electrical RF signal with its own electrical RF signal, perform the electrophotic conversion operation for the coupled result and transmit the resulting optical signal.

In accordance with another aspect of the present invention, there is provided a multi-drop repeating unit using an extension of analog optical transmission in a mobile communication system, comprising: a main unit for performing functions of a mobile communication base station, the functions including a function of converting an analog RF signal into an optical signal and transmitting the converted optical signal, a function of receiving an optical signal and converting the received optical signal into an analog RF signal, a modulation/demodulation function, an IF/RF conversion function, and an encoding/decoding function; and a plurality of repeaters cascaded to the main unit on a sector basis, each of the repeaters being adapted to, in a forward mode, receive an analog optical signal, perform a photoelectric conversion operation for the received analog optical signal, split the resulting electrical RF signal into electrical RF signals of two paths, amplify the electrical RF signal of one of the two paths, perform an electrophotic conversion operation for the amplified electrical RF signal, transmit the resulting optical signal, amplify the electrical RF signal of the other path and transmit the amplified electrical RF signal to an associated terminal, and to, in a backward mode, receive an analog optical signal, perform the photoelectric conversion operation for the received analog optical signal, amplify the resulting electrical RF signal, couple the amplified electrical RF signal with its own electrical RF signal, perform the electrophotic conversion operation for the coupled result and transmit the resulting optical signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a detailed description will be given of a distributed multi-drop base station unit using an extension of analog optical transmission in a mobile communication system in accordance with a preferred embodiment of the present invention with reference to the annexed drawings. For a better understanding of the below description, a remote unit closer to a main unit relative to an arbitrary remote unit will be referred to as a previous remote unit, and a farther remote unit will be referred to as a next remote unit.

Figure 2:
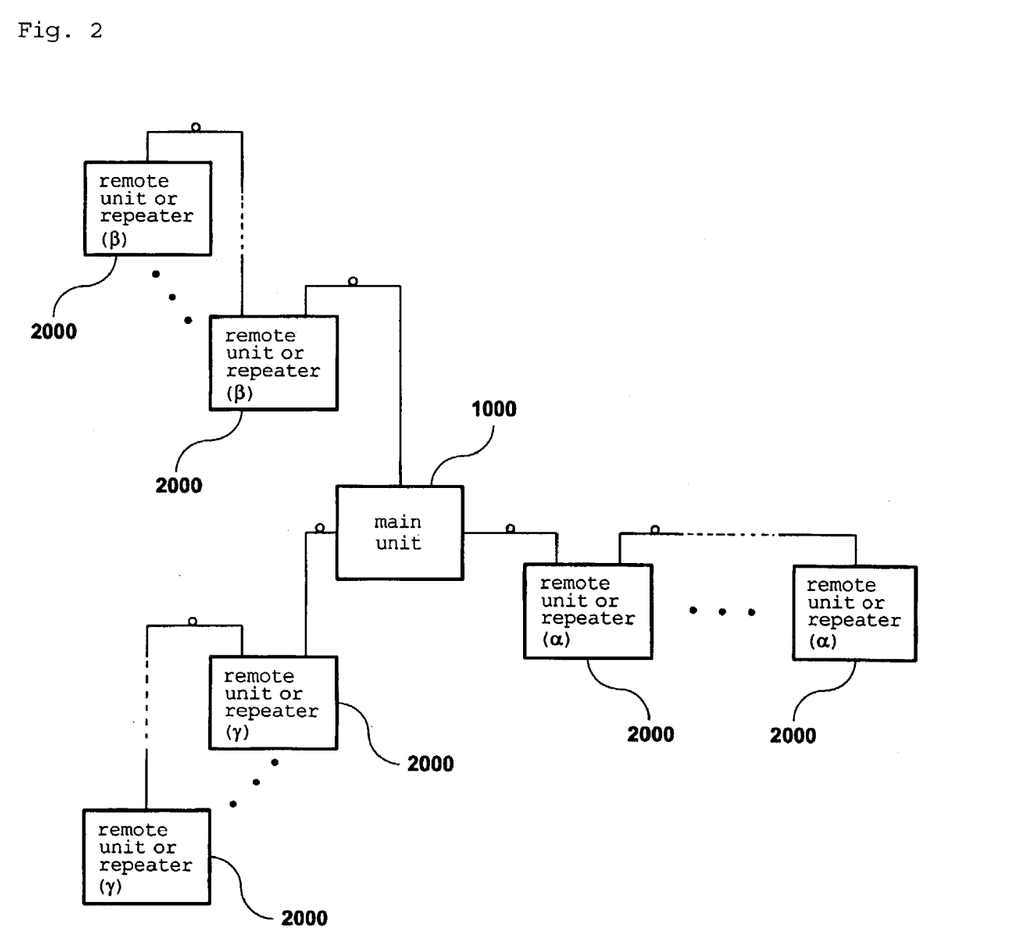
FIG. 2 is a block diagram showing the construction of a distributed multi-drop base station/repeating unit using an extension of analog optical transmission in a mobile communication system in accordance with a preferred embodiment of the present invention.

The distributed multi-drop base station unit according to the preferred embodiment of the present invention comprises, as shown in FIG. 2, one main unit 1000, and a plurality of remote units 2000 cascaded to the main unit 100 on a sector basis.

The main unit 1000 is a base station of the mobile communication system, which does not have a function of performing radio frequency (RF) transmission and reception with a terminal 10. The main unit 1000 acts to perform functions of the mobile communication base station, such as a function of converting an analog RF signal into an optical signal and transmitting the converted optical signal to an associated one of the remote units 2000, a function of receiving an optical signal from any one of the remote units 2000 and converting the received optical signal into an analog RF signal, a modulation/demodulation function, an intermediate frequency (IF)/RF conversion function, an encoding/decoding function, etc.

Figure 3:
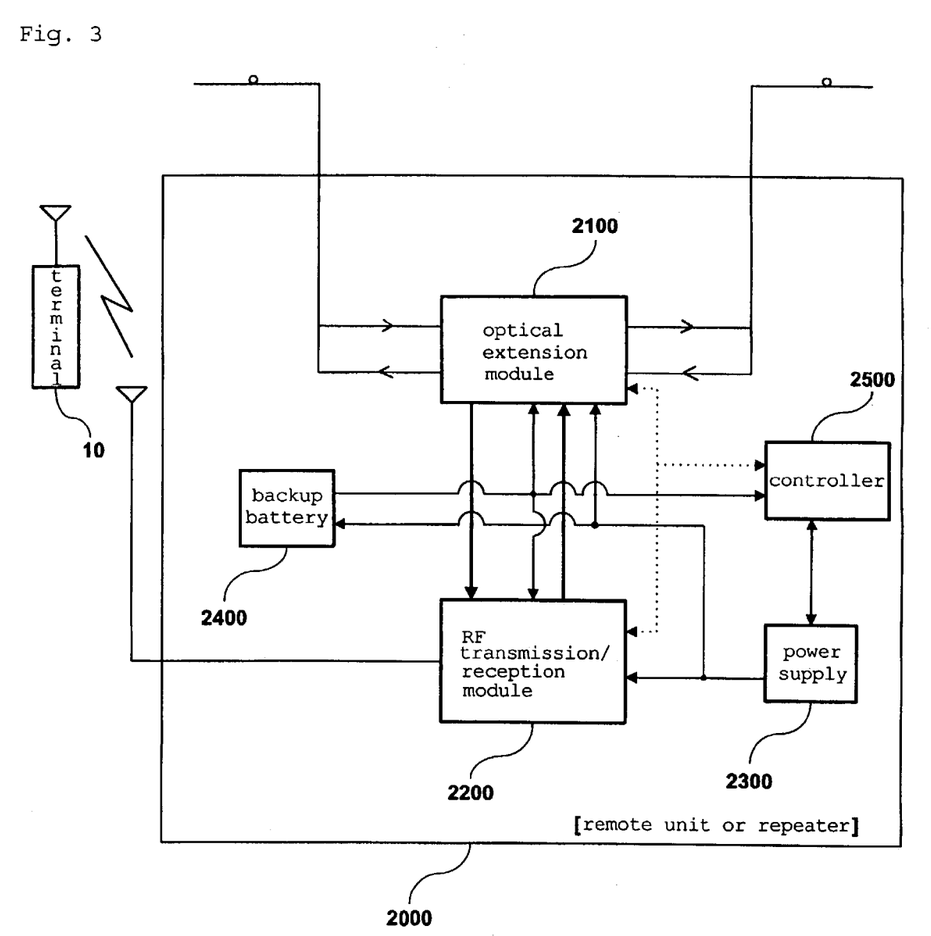
FIG. 3 is a functional block diagram showing a first embodiment of a remote unit or repeater in the base station/repeating unit of FIG. 2.

Each of the plurality of remote units 2000, which are cascaded to the main unit 1000 on a sector basis, acts to, in a forward mode, receive an analog optical signal from the main unit 1000 or a previous remote unit 2000, perform a photoelectric conversion operation for the received analog optical signal, split the resulting electrical RF signal into electrical RF signals of two paths, amplify the electrical RF signal of one of the two paths, perform an electrophotic conversion operation for the amplified electrical RF signal, transmit the resulting optical signal to a next remote unit 2000 and transmit the electrical RF signal of the other path to an associated terminal 10. In a backward mode, each of the remote units 2000 receives an analog optical signal from the next remote unit 2000, performs the photoelectric conversion operation for the received analog optical signal, amplifies the resulting electrical RF signal, couples the amplified electrical RF signal with its own electrical RF signal, performs the electrophotic conversion operation for the coupled result and transmits the resulting optical signal to the main unit 1000 or the previous remote unit 2000. To this end, in one embodiment, the remote units 2000 each include, as shown in FIG. 3, an optical extension module 2100, an RF transmission/reception module 2200, a power supply 2300, a backup battery 2400 and a controller 2500.

The optical extension module 2100 acts to, in the forward mode, receive the analog optical signal from the main unit 1000 or the previous remote unit 2000, perform the photoelectric conversion operation for the received analog optical signal, split the resulting electrical RF signal into the electrical RF signals of the two paths, amplify the electrical RF signal of one of the two paths, perform the electrophotic conversion operation for the amplified electrical RF signal, transmit the resulting optical signal to the next remote unit 2000 and transfer the electrical RF signal of the other path to the RF transmission/reception module 2200. The optical extension module 2100 also acts to, in the backward mode, receive the analog optical signal from the next remote unit 2000, perform the photoelectric conversion operation for the received analog optical signal, amplify the resulting electrical RF signal, couple the amplified electrical RF signal with an electrical RF signal from the RF transmission/reception module 2200, perform the electrophotic conversion operation for the coupled result and transmit the resulting optical signal to the main unit 1000 or the previous remote unit 2000.

The RF transmission/reception module 2200 acts to amplify the electrical RF signal of the other path transferred from the optical extension module 2100 and radiate the amplified electrical RF signal to the associated terminal 10. The RF transmission/reception module 2200 further acts to receive an electrical RF signal from the associated terminal 10 and transfer the received electrical RF signal to the optical extension module 2100 as the electrical RF signal to be coupled.

The power supply 2300 functions to supply power to the optical extension module 2100, RF transmission/reception module 2200, backup battery 2400 and controller 2500.

The backup battery 2400 is connected to the power supply 2300 to charge itself with the power from the power supply 2300 as backup power. The backup battery 2400 functions to, in an emergency situation, supply the backup power to the optical extension module 2100, RF transmission/reception module 2200 and controller 2500 automatically or in response to a backup power supply control signal from the controller 2500.

The controller 2500 is adapted to perform various control functions of a corresponding one of the remote units 2000. For example, the controller 2500 functions to monitor the states of the optical extension module 2100, RF transmission/reception module 2200 and power supply 2300, and generate an alarm to a main controller (not shown) in the main unit 1000 if a fault occurs during the state monitoring.

Figure 4:
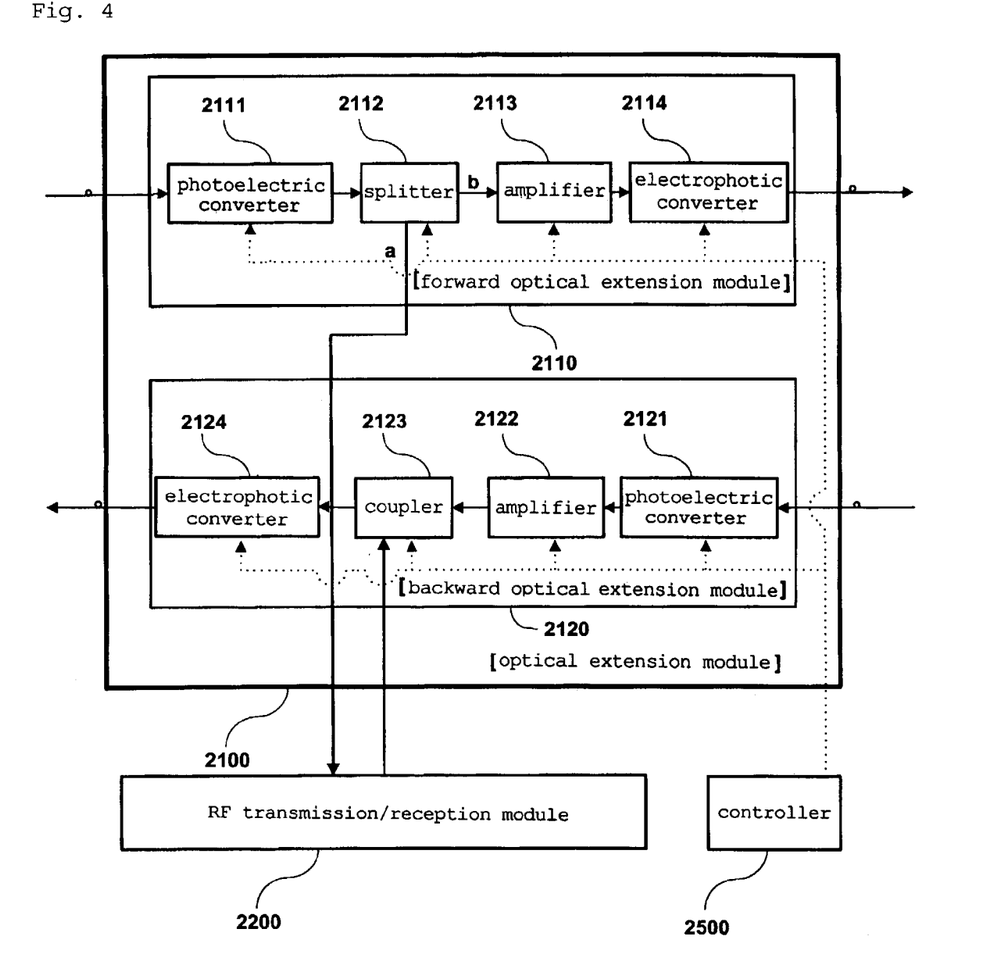
FIG. 4 is a functional block diagram of an optical extension module in the remote unit or repeater of FIG. 3.

The optical extension module 2100 is provided with a forward optical extension module 2110 and a backward optical extension module 2120, as shown in FIG. 4.

The forward optical extension module 2110 acts to receive the analog optical signal from the main unit 1000 or the previous remote unit 2000, perform the photoelectric conversion operation for the received analog optical signal, split the resulting electrical RF signal into the electrical RF signals of the two paths, amplify the electrical RF signal of one of the two paths, perform the electrophotic conversion operation for the amplified electrical RF signal, transmit the resulting optical signal to the next remote unit 2000 and transfer the electrical RF signal of the other path to the RF transmission/reception module 2200. To this end, the forward optical extension module 2110 includes, as shown in FIG. 4, a photoelectric converter 2111, a splitter 2112, an amplifier 2113 and an electrophotic converter 2114.

The photoelectric converter 2111 in the forward optical extension module 2110 acts to receive the analog optical signal from the main unit 1000 or the previous remote unit 2000, convert the received analog optical signal into an electrical RF signal and output the converted electrical RF signal to the splitter 2112.

The splitter 2112 in the forward optical extension module 2110 acts to receive the electrical RF signal from the photoelectric converter 2111 and split the received electrical RF signal into electrical RF signals of the two paths, a path a to the RF transmission/reception module 2200 and a path b to the amplifier 2113, which is an extension path of the splitter 2112.

The amplifier 2113 in the forward optical extension module 2110 acts to receive the electrical RF signal from the extension path b of the splitter 2112, amplify the received electrical RF signal by a predetermined gain and output the amplified electrical RF signal to the electrophotic converter 2114. Here, the gain of the amplifier 2113 is predetermined in consideration of an attenuation value occurring when an input optical signal is passed through the optical extension module 2100.

The electrophotic converter 2114 in the forward optical extension module 2110 acts to receive the electrical RF signal from the amplifier 2113, convert the received electrical RF signal into an optical signal and transmit the converted optical signal to the next remote unit 2000.

The backward optical extension module 2120 acts to receive the analog optical signal from the next remote unit 2000, perform the photoelectric conversion operation for the received analog optical signal, amplify the resulting electrical RF signal, couple the amplified electrical RF signal with the electrical RF signal from the RF transmission/reception module 2200, perform the electrophotic conversion operation for the coupled result and transmit the resulting optical signal to the main unit 1000 or the previous remote unit 2000. To this end, the backward optical extension module 2120 includes, as shown in FIG. 4, a photoelectric converter 2121, an amplifier 2122, a coupler 2123 and an electrophotic converter 2124.

The photoelectric converter 2121 in the backward optical extension module 2120 acts to receive the analog optical signal from the next remote unit 2000, convert the received analog optical signal into an electrical RF signal and output the converted electrical RF signal to the amplifier 2122.

The amplifier 2122 in the backward optical extension module 2120 acts to receive the electrical RF signal from the photoelectric converter 2121, amplify the received electrical RF signal by a predetermined gain and output the amplified electrical RF signal to the coupler 2123.

The coupler 2123 in the backward optical extension module 2120 acts to couple the amplified electrical RF signal from the amplifier 2122 with the electrical RF signal from the RF transmission/reception module 2200 and output the resulting electrical RF signal to the electrophotic converter 2124.

The electrophotic converter 2124 in the backward optical extension module 2120 acts to receive the electrical RF signal from the coupler 2123, convert the received electrical RF signal into an analog optical signal and transmit the converted optical signal to the main unit 1000 or the previous remote unit 2000.

Figure 5:
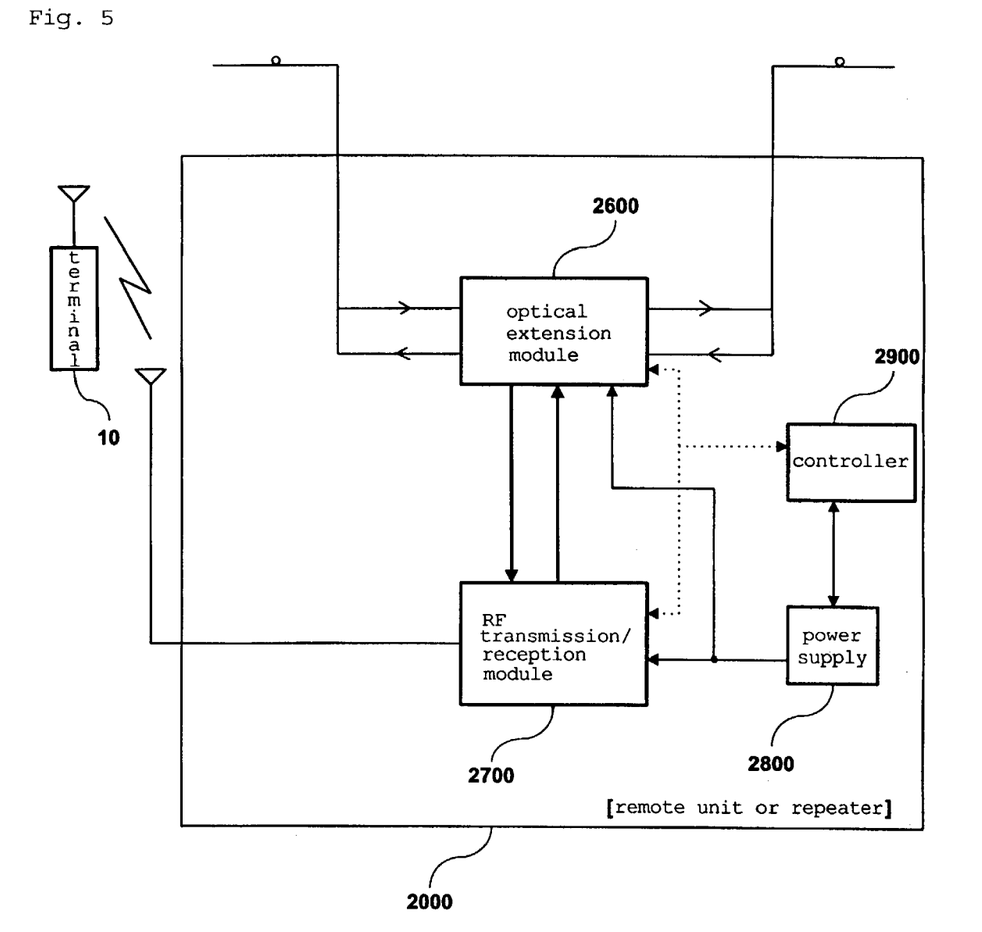
FIG. 5 is a functional block diagram showing a second embodiment of the remote unit or repeater in the base station/repeating unit of FIG. 2.

In an alternative embodiment, the remote units 2000 each include, as shown in FIG. 5, an optical extension module 2600, an RF transmission/reception module 2700, a power supply 2800 and a controller 2900.

The optical extension module 2600 acts to, in the forward mode, receive the analog optical signal from the main unit 1000 or the previous remote unit 2000, perform the photoelectric conversion operation for the received analog optical signal, split the resulting electrical RF signal into the electrical RF signals of the two paths, amplify the electrical RF signal of one of the two paths, perform the electrophotic conversion operation for the amplified electrical RF signal, transmit the resulting optical signal to the next remote unit 2000 and transfer the electrical RF signal of the other path to the RF transmission/reception module 2700. The optical extension module 2600 also acts to, in the backward mode, receive the analog optical signal from the next remote unit 2000, perform the photoelectric conversion operation for the received analog optical signal, amplify the resulting electrical RF signal, couple the amplified electrical RF signal with an electrical RF signal from the RF transmission/reception module 2700, perform the electrophotic conversion operation for the coupled result and transmit the resulting optical signal to the main unit 1000 or the previous remote unit 2000. The optical extension module 2600 further acts to bypass both the optical signals received in the forward mode and backward mode in response to a bypass control signal generated due to the interruption of power supply.

The RF transmission/reception module 2700 acts to amplify the electrical RF signal of the other path transferred from the optical extension module 2600 and radiate the amplified electrical RF signal to the associated terminal 10. The RF transmission/reception module 2700 further acts to receive an electrical RF signal from the associated terminal 10 and transfer the received electrical RF signal to the optical extension module 2600 as the electrical RF signal to be coupled.

The power supply 2800 functions to supply power to the optical extension module 2600, RF transmission/reception module 2700 and controller 2900.

The controller 2900 is adapted to perform various control functions of a corresponding one of the remote units 2000.

For example, the controller 2900 functions to monitor the states of the optical extension module 2600, RF transmission/reception module 2700 and power supply 2800, and generate an alarm to a main controller (not shown) in the main unit 1000 if a fault occurs during the state monitoring. The controller 2900 also functions to generate the bypass control signal to the optical extension module 2600 upon the interruption of power supply.

Figure 6:
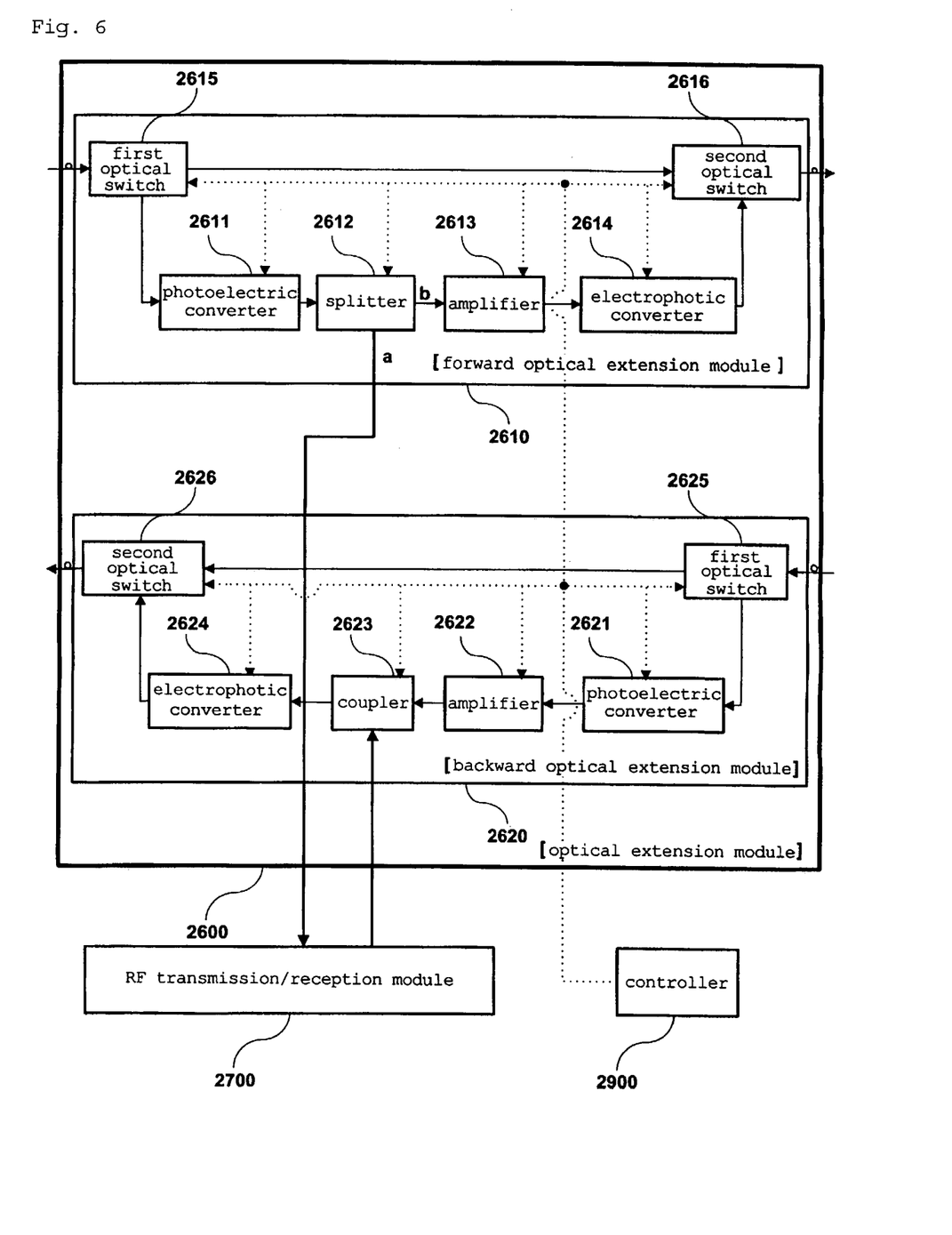
FIG. 6 is a functional block diagram of an optical extension module in the remote unit or repeater of FIG. 5.

The optical extension module 2600 is provided with a forward optical extension module 2610 and a backward optical extension module 2620, as shown in FIG. 6.

The forward optical extension module 2610 acts to receive the analog optical signal from the main unit 1000 or the previous remote unit 2000, perform the photoelectric conversion operation for the received analog optical signal, split the resulting electrical RF signal into the electrical RF signals of the two paths, amplify the electrical RF signal of one of the two paths, perform the electrophotic conversion operation for the amplified electrical RF signal, transmit the resulting optical signal to the next remote unit 2000 and transfer the electrical RF signal of the other path to the RF transmission/reception module 2700. The forward optical extension module 2610 also acts to bypass the received analog optical signal to the next remote unit 2000 upon the interruption of power supply or in response to the bypass control signal from the controller 2900. To this end, the forward optical extension module 2610 includes, as shown in FIG. 6, a photoelectric converter 2611, a splitter 2612, an amplifier 2613, an electrophotic converter 2614, a first optical switch 2615 and a second optical switch 2616.

The photoelectric converter 2611 in the forward optical extension module 2610 acts to receive the analog optical signal from the main unit 1000 or the previous remote unit 2000, convert the received analog optical signal into an electrical RF signal and output the converted electrical RF signal to the splitter 2612.

The splitter 2612 in the forward optical extension module 2610 acts to receive the electrical RF signal from the photoelectric converter 2611 and split the received electrical RF signal into electrical RF signals of the two paths, a path a to the RF transmission/reception module 2700 and a path b to the amplifier 2613, which is an extension path of the splitter 2612.

The amplifier 2613 in the forward optical extension module 2610 acts to receive the electrical RF signal from the extension path b of the splitter 2612, amplify the received electrical RF signal by a predetermined gain and output the amplified electrical RF signal to the electrophotic converter 2614. Here, the gain of the amplifier 2613 is predetermined in consideration of an attenuation value occurring when an input optical signal is passed through the optical extension module 2600.

The electrophotic converter 2614 in the forward optical extension module 2610 acts to receive the electrical RF signal from the amplifier 2613, convert the received electrical RF signal into an optical signal and transmit the converted optical signal to the next remote unit 2000.

The first optical switch 2615 in the forward optical extension module 2610 is connected to a signal input terminal of the photoelectric converter 2611 to switch the analog optical signal from the main unit 1000 or the previous remote unit 2000 to the photoelectric converter 2611 in the normal condition. The first optical switch 2615 also acts to switch the analog optical signal from the main unit 1000 or the previous remote unit 2000 to the second optical switch 2616 in response to the bypass control signal from the controller 2900.

The second optical switch 2616 in the forward optical extension module 2610 is connected to a signal output terminal of the electrophotic converter 2614 to switch the optical signal from the electrophotic converter 2614 to the next remote unit 2000 in the normal condition. The second optical switch 2616 also acts to bypass an output signal from the first optical switch 2615 to the next remote unit 2000 in response to the bypass control signal from the controller 2900.

The backward optical extension module 2620 acts to receive the analog optical signal from the next remote unit 2000, perform the photoelectric conversion operation for the received analog optical signal, amplify the resulting electrical RF signal, couple the amplified electrical RF signal with the electrical RF signal from the RF transmission/reception module 2700, perform the electrophotic conversion operation for the coupled result and transmit the resulting optical signal to the main unit 1000 or the previous remote unit 2000. The backward optical extension module 2620 also acts to bypass the received analog optical signal to the main unit 1000 or the previous remote unit 2000 upon the interruption of power supply or in response to the bypass control signal from the controller 2900. To this end, the backward optical extension module 2620 includes, as shown in FIG. 6, a photoelectric converter 2621, an amplifier 2622, a coupler 2623, an electrophotic converter 2624, a first optical switch 2625 and a second optical switch 2626.

The photoelectric converter 2621 in the backward optical extension module 2620 acts to receive the analog optical signal from the next remote unit 2000, convert the received analog optical signal into an electrical RF signal and output the converted electrical RF signal to the amplifier 2622.

The amplifier 2622 in the backward optical extension module 2620 acts to receive the electrical RF signal from the photoelectric converter 2621, amplify the received electrical RF signal by a predetermined gain and output the amplified electrical RF signal to the coupler 2623.

The coupler 2623 in the backward optical extension module 2620 acts to couple the amplified electrical RF signal from the amplifier 2622 with the electrical RF signal from the RF transmission/reception module 2700 and output the resulting electrical RF signal to the electrophotic converter 2624.

The electrophotic converter 2624 in the backward optical extension module 2620 acts to receive the electrical RF signal from the coupler 2623, convert the received electrical RF signal into an analog optical signal and transmit the converted optical signal to the main unit 1000 or the previous remote unit 2000.

The first optical switch 2625 in the backward optical extension module 2620 is connected to a signal input terminal of the photoelectric converter 2621 to switch the analog optical signal from the next remote unit 2000 to the photoelectric converter 2621 in the normal condition. The first optical switch 2625 also acts to switch the analog optical signal from the next remote unit 2000 to the second optical switch 2626 in response to the bypass control signal from the controller 2900.

The second optical switch 2626 in the backward optical extension module 2620 is connected to a signal output terminal of the electrophotic converter 2624 to switch the optical signal from the electrophotic converter 2624 to the main unit 1000 or the previous remote unit 2000 in the normal condition. The second optical switch 2626 also acts to bypass an output signal from the first optical switch 2625 to the main unit 1000 or the previous remote unit 2000 in response to the bypass control signal from the controller 2900.

The operation of the distributed multi-drop base station unit with the above-stated construction in accordance with the preferred embodiment of the present invention will hereinafter be described with reference to the annexed drawings.

First, a description will be given of the forward-mode operation of the distributed multi-drop base station unit with reference to FIGS. 2 to 4. First, upon receiving an analog optical signal from the main unit 1000 or the previous remote unit 2000, the photoelectric converter 2111 in the forward optical extension module 2110 of each of the remote units 2000 converts the received analog optical signal into an electrical RF signal and outputs the converted electrical RF signal to the splitter 2112.

The splitter 2112 in the forward optical extension module 2110 receives the electrical RF signal from the photoelectric converter 2111 and splits the received electrical RF signal into electrical RF signals of the two paths, the path a to the RF transmission/reception module 2200 and the path b to the amplifier 2113, which is the extension path of the splitter 2112.

The RF transmission/reception module 2200 radiates the electrical RF signal of the path a transferred from the optical extension module 2100 to the associated terminal 10.

On the other hand, the amplifier 2113 in the forward optical extension module 2110 receives the electrical RF signal from the extension path b of the splitter 2112, amplifies the received electrical RF signal by a predetermined gain and outputs the amplified electrical RF signal to the electrophotic converter 2114.

The electrophotic converter 2114 in the forward optical extension module 2110 receives the electrical RF signal from the amplifier 2113, converts the received electrical RF signal into an optical signal and transmits the converted optical signal to the next remote unit 2000.

At this time, the controller 2500 performs various control functions of the corresponding remote unit, 2000. For example, the controller 2500 monitors the states of the optical extension module 2100, RF transmission/reception module 2200 and power supply 2300, and generates an alarm to the main unit 1000 if a fault occurs during the state monitoring.

As a result, the backup battery 2400 supplies backup power to the optical extension module 2100 and RF transmission/reception module 2200 automatically or in response to the backup power supply control signal from the controller 2500.

Next, a description will be given of the backward-mode operation of the distributed multi-drop base station unit with reference to FIGS. 2 to 4.

First, upon receiving an analog optical signal from the next remote unit 2000, the photoelectric converter 2121 in the backward optical extension module 2120 of each of the remote units 2000 converts the received analog optical signal into an electrical RF signal and outputs the converted electrical RF signal to the amplifier 2122.

The amplifier 2122 in the backward optical extension module 2120 receives the electrical RF signal from the photoelectric converter 2121, amplifies the received electrical RF signal by a predetermined gain and outputs the amplified electrical RF signal to the coupler 2123.

The coupler 2123 in the backward optical extension module 2120 couples the amplified electrical RF signal from the amplifier 2122 with an electrical RF signal from the RF transmission/reception module 2200 and outputs the resulting electrical RF signal to the electrophotic converter 2124.

The electrophotic converter 2124 in the backward optical extension module 2120 receives the electrical RF signal from the coupler 2123, converts the received electrical RF signal into an analog optical signal and transmits the converted optical signal to the main unit 1000 or the previous remote unit 2000.

At this time, the controller 2500 performs various control functions of the corresponding remote unit 2000, including a function of monitoring the states of the optical extension module 2100, RF transmission/reception module 2200 and power supply 2300, and generating an alarm to the main unit 1000 if a fault occurs during the state monitoring.

If a fault occurs, the backup battery 2400 supplies backup power to the optical extension module 2100 and RF transmission/reception module 2200 automatically or in response to the backup power supply control signal from the controller 2500.

On the other hand, the forward-mode and backward-mode operations of the second embodiment of each remote unit 2000 shown in FIGS. 5 and 6 are performed in the same manner as those of the first embodiment shown in FIGS. 3 and 4, and a description thereof will thus be omitted. However, the optical extension module 2100 in the first embodiment shown in FIGS. 3 and 4 and the optical extension module 2600 in the second embodiment shown in FIGS. 5 and 6 are different in construction and operation from each other, only in that they cope with the interruption of power supply in different manners. In detail, in an emergency condition, the second embodiment is adapted to bypass an optical signal through the switching control of the first and second optical switches 2615 and 2616 by the controller 2900, whereas the first embodiment is adapted to supply power to the respective components through the backup battery 2400.

Meanwhile, a multi-drop repeating unit using an extension of analog optical transmission in a mobile communication system in accordance with a preferred embodiment of the present invention can be implemented by merely replacing the remote units in the multi-drop base station unit with repeaters, as shown in FIG. 2. Therefore, the multi-drop repeating unit is substantially the same in construction and operation as the multi-drop base station unit and a description thereof will thus be omitted.

As apparent from the above description, the present invention provides a distributed multi-drop base station/repeating unit using an extension of analog optical transmission in a mobile communication system, wherein a plurality of remote units or repeaters are cascaded to a main unit without limitations in extension distances between the main unit and the remote units or repeaters resulting from optical signal attenuation and transmission/reception noise. Therefore, the present invention has the effect of improving the quality of a mobile communication service and promoting economical and technical improvements of the mobile communication system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distributed multi-drop base station unit using an extension of analog optical transmission in a mobile communication system, comprising:

a main unit for performing functions of a mobile communication base station, the functions including a function of converting an analog radio frequency (RF) signal into an optical signal and transmitting the converted optical signal, a function of receiving an optical signal and converting the received optical signal into an analog RF signal, a modulation/demodulation function, an intermediate frequency (IF)/RF conversion function, and an encoding/decoding function; and a plurality of remote units cascaded to the main unit on a sector basis, each of the remote units being adapted to, in a forward mode, receive a first optical signal, perform a first photoelectric conversion operation for the first optical signal to create a first electrical RF signal, split the first electrical RF signal into a second electrical RF signal and a third electrical RF signal, amplify the second electrical RF signal, perform a first electrophotic conversion operation for the amplified second electrical RF signal to create a second optical signal, transmit the second optical signal, amplify the third electrical RF signal and transmit the amplified third electrical RF signal to an associated terminal, and to, in a backward mode, receive a third optical signal, perform a second photoelectric conversion operation for the third optical signal to create a fourth electrical RF signal, amplify the fourth electrical RF signal, receive a fifth electrical RF signal from the associated terminal, couple the amplified fourth electrical RF signal with the fifth electrical RF signal to create a coupled electrical RF signal, perform a second electrophotic conversion operation for the coupled electrical RF signal to create a fourth optical signal, and transmit the fourth optical signal.

2. The distributed multi-drop base station unit as set forth in claim 1, wherein the remote units each include:

an optical extension module for, in the forward mode, receiving the first optical signal from the main unit or a previous remote unit, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal, and transmitting the second optical signal to a next remote unit, and for, in the backward mode, receiving the third optical signal from the next remote unit, performing the second photoelectric conversion operation for the third optical signal to create the fourth electrical RF signal, amplifying the fourth electrical RF signal, receiving the fifth electrical RF signal from an RF transmission/reception module, coupling the amplified fourth electrical RF signal with the fifth electrical RF signal to create the coupled electrical RF signal, performing the second electrophotic conversion operation for the coupled electrical RF signal to create the fourth optical signal, and transmitting the fourth optical signal to the main unit or previous remote unit;

the RF transmission/reception module for radiating the third electrical RF signal from the optical extension module to the associated terminal, receiving the fifth electrical RF signal from the associated terminal and transferring the fifth electrical RF signal to the optical extension module;

a power supply for supplying power to the optical extension module and RF transmission/reception module;

a backup battery connected to the power supply for charging the backup battery with the power from the power supply as backup power, the backup battery supplying the backup power to the optical extension module and RF transmission/reception module in response to a backup power supply control signal or automatically in an emergency situation; and a controller for monitoring states of the optical extension module, RF transmission/reception module and power supply, generating an alarm to the main unit if a fault occurs during the state monitoring, and controlling the modules in response to at least one control signal from the main unit.

3. The distributed multi-drop base station unit as set forth in claim 2, wherein the optical extension module includes: a forward optical extension module for receiving the first optical signal from the main unit or previous remote unit, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal and transmitting the second optical signal to the next remote unit; and a backward optical extension module for receiving the third optical signal from the next remote unit, performing the second photoelectric conversion operation for the third optical signal to create the fourth electrical RF signal, amplifying the fourth electrical RF signal, receiving the fifth electrical RF signal from the RF transmission/reception module, coupling the amplified fourth electrical RF signal with the fifth electrical RF signal to create the coupled electrical RF signal, performing the second electrophotic conversion operation for the coupled electrical RF signal to create the fourth optical signal, and transmitting the fourth optical signal to the main unit or previous remote unit.

4. The distributed multi-drop base station unit as set forth in claim 3, wherein the forward optical extension module includes:

a first photoelectric converter for receiving the first optical signal from the main unit or previous remote unit and converting the first optical signal into the first electrical RF signal;

a first splitter for receiving the first electrical RF signal from the first photoelectric converter and splitting the first electrical RF signal into the second electrical RF signal and the third electrical RF signal, the third electrical RF signal being a path to the RF transmission/reception module, the second electrical RF signal being an extension path of the splitter;

a first amplifier for receiving the second electrical RF signal from the extension path of the first splitter and amplifying the second electrical RF signal by a predetermined gain; and a first electrophotic converter for receiving the amplified second electrical RF signal from the first amplifier, converting the second electrical RF signal into the second optical signal and transmitting the second optical signal to the next remote unit.

5. The distributed multi-drop base station unit as set forth in claim 3, wherein the backward optical extension module includes:

a second photoelectric converter for receiving the third optical signal from the next remote unit and converting the third optical signal into the fourth electrical RF signal;

a second amplifier for receiving the fourth electrical RF signal from the second photoelectric converter and amplifying the fourth electrical RF signal by a predetermined gain;

a second coupler for coupling the amplified fourth electrical RF signal from the second amplifier with the fifth electrical RF signal from the RF transmission/reception module to create the coupled electrical RF signal; and a second electrophotic converter for receiving the coupled electrical RF signal from the second coupler, converting the coupled electrical RF signal into the fourth analog optical signal and transmitting the fourth optical signal to the main unit or previous remote unit.

6. The distributed multi-drop base station unit as set forth in claim 1, wherein the remote units each include:

an optical extension module for, in the forward mode, receiving the first optical signal from the main unit or previous remote unit, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal, and transmitting the second optical signal to the next remote unit, and for, in the backward mode, receiving the third optical signal from the next remote unit, performing the second photoelectric conversion operation for the third optical signal to create the fourth electrical RF signal, amplifying the fourth electrical RF signal, receiving the fifth electrical RF signal from an RF transmission/reception module, coupling the amplified fourth electrical RF signal with the fifth electrical RF signal to create the coupled electrical RF signal, performing the second electrophotic conversion operation for the coupled electrical RF signal to create the fourth optical signal, and transmitting the fourth optical signal to the main unit or previous remote unit, the optical extension module bypassing both the first optical signal received in the forward mode and the third optical signal received in the backward mode in response to a bypass control signal generated due to the interruption of power supply;

the RF transmission/reception module for radiating the third electrical RF signal from the optical extension module to the associated terminal, receiving the fifth electrical RF signal from the associated terminal and transferring the fifth electrical RF signal to the optical extension module;

a power supply for supplying power to the optical extension module and RF transmission/reception module; and a controller for monitoring states of the optical extension module, RF transmission/reception module and power supply, generating an alarm to the main unit if a fault occurs during the state monitoring, and controlling the modules in response to at least one control signal from the main unit, the controller generating the bypass control signal to the optical extension module upon the interruption of power supply.

7. The distributed multi-drop base station unit as set forth in claim 6, wherein the optical extension module includes:

a forward optical extension module for receiving the first optical signal from the main unit or previous remote unit, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal and transmitting the second optical signal to the next remote unit, the forward optical extension module bypassing the first optical signal to the next remote unit in response to the bypass control signal from the controller or automatically upon the interruption of power supply; and a backward optical extension module for receiving the third optical signal from the next remote unit, performing the second photoelectric conversion operation for the third optical signal to create the fourth electrical RF signal, amplifying the fourth electrical RF signal, receiving the fifth electrical RF signal from the RF transmission/reception module, coupling the amplified fourth electrical RF signal with the fifth electrical RF signal to create the coupled electrical RF signal, performing the second electrophotic conversion operation for the coupled electrical RF signal to create the fourth optical signal and transmitting the fourth optical signal to the main unit or previous remote unit, the backward optical extension module bypassing the third optical signal to the main unit or previous remote unit in response to the bypass control signal from the controller upon the interruption of power supply.

8. The distributed multi-drop base station unit as set forth in claim 7, wherein the forward optical extension module includes:

a first photoelectric converter for receiving the first optical signal from the main unit or previous remote unit and converting the first optical signal into the first electrical RF signal;

a first splitter for receiving the first electrical RF signal from the first photoelectric converter and splitting the first electrical RF signal into the second electrical RF signal and the third electrical RF signal, the third electrical RF signal being a path to the RF transmission/reception module, the the second electrical RF signal being an extension path of the splitter;

a first amplifier for receiving the second electrical RF signal from the extension path of the first splitter and amplifying the second electrical RF signal by a predetermined gain;

a first electrophotic converter for receiving the amplified second electrical RF signal from the amplifier, converting the second electrical RF signal into the second optical signal and transmitting the second optical signal to the next remote unit; and a first set of first and second optical switches connected respectively to a signal input terminal of the first photoelectric converter and a signal output terminal of the first electrophotic converter, the first set of first and second optical switches performing a switching operation in a normal condition to pass the first optical signal from the main unit or previous remote unit through the first photoelectric converter, first splitter, first amplifier and first electrophotic converter, and bypassing the first optical signal from the main unit or previous remote unit to the next remote unit in response to the bypass control signal from the controller.

9. The distributed multi-drop base station unit as set forth in claim 7, wherein the backward optical extension module includes:

a second photoelectric converter for receiving the third optical signal from the next remote unit and converting the third optical signal into the fourth electrical RF signal;

a second amplifier for receiving the fourth electrical RF signal from the second photoelectric converter and amplifying the fourth electrical RF signal by a predetermined gain;

a second coupler for coupling the amplified fourth electrical RF signal from the second amplifier with the fifth electrical RF signal from the RF transmission/reception module to create the coupled electrical RF signal;

a second electrophotic converter for receiving the coupled electrical RF signal from the second coupler, converting the coupled electrical RF signal into the fourth optical signal and transmitting the fourth optical signal to the main unit or previous remote unit; and a second set of first and second optical switches connected respectively to a signal input terminal of the second photoelectric converter and a signal output terminal of the second electrophotic converter, the second set of first and second optical switches performing a switching operation in a normal condition to pass the third optical signal from the next remote unit through the second photoelectric converter, second amplifier, second coupler and second electrophotic converter, and bypassing the third optical signal from the next remote unit to the main unit or previous remote unit in response to the bypass control signal from the controller.

10. A multi-drop repeating unit using an extension of optical transmission in a mobile communication system, comprising:

a main unit for performing functions of a mobile communication base station, the functions including a function of converting RF signal into optical signal and transmitting the converted optical signal, a function of receiving optical signal and converting the received optical signal into an analog RF signal, a modulation/demodulation function, an IF/RF conversion function, and an encoding/decoding function; and a plurality of repeaters cascaded to the main unit on a sector basis, each of the repeaters being adapted to, in a forward mode, receive a first optical signal, perform a first photoelectric conversion operation for the first optical signal to create a first electrical RF signal, split the first electrical RF signal into a second electrical RF signal and a third electrical RF signal, amplify the second electrical RF signal, perform a first electrophotic conversion operation for the amplified second electrical RF signal to create a second optical signal, transmit the second optical signal, amplify the third electrical RF signal and transmit the amplified third electrical RF signal to associated terminal, and to, in a backward mode, receive a third optical signal, perform a second photoelectric conversion operation for the third optical signal to create a fourth electrical RF signal, amplify the fourth electrical RF signal, receive a fifth electrical RF signal from the associated terminal, couple the amplified fourth electrical RF signal with the fifth electrical RF signal create a coupled electrical RF signal, perform a second electrophotic conversion operation for the coupled electrical RF signal to create a fourth optical signal, and transmit the fourth optical signal.

11. The multi-drop repeating unit as set forth in claim 10, wherein the repeaters each include:

an optical extension module for, in the forward mode, receiving the first optical signal from the main unit or a previous repeater, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal, and transmitting the second optical signal to a next repeater, and for, in the backward mode, receiving the third optical signal from the next repeater, performing the second photoelectric conversion operation for the third optical signal to create the fourth electrical RF signal, amplifying the fourth electrical RF signal, receiving the fifth electrical RF signal from RF transmission/reception module, coupling the amplified fourth electrical RF signal with the fifth electrical RF signal to create the coupled electrical RF signal, performing the second electrophotic conversion operation for the coupled electrical RF signal to create the fourth optical signal, and transmitting the fourth optical signal to the main unit or previous repeater;

the RF transmission/reception module for radiating the third electrical RF signal from the optical extension module to the associated terminal, receiving the fifth electrical RF signal from the associated terminal and transferring the fifth electrical RF signal to the optical extension module;

a power supply for supplying power to the optical extension module and RF transmission/reception module;

a backup battery connected to the power supply for charging the backup battery with the power from the power supply as backup power, the backup battery supplying the backup power to the optical extension module and RF transmission/reception module in response to a backup power supply control signal or automatically in emergency situation; and a controller for monitoring states of the optical extension module, RF transmission/reception module and power supply, generating alarm to the main unit if a fault occurs during the state monitoring, and controlling the modules in response to at least one control signal from the main unit.

12. The multi-drop repeating unit as set forth in claim 11, wherein the optical extension module includes:

a forward optical extension module for receiving the first optical signal from the main unit or previous repeater, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal and transmitting the second optical signal to the next repeater; and a backward optical extension module for receiving the third optical signal from the next repeater, performing the second photoelectric conversion operation for the third optical signal to create the fourth electrical RF signal, amplifying the fourth electrical RF signal, receiving the fifth electrical RF signal from the RF transmission/reception module, coupling the amplified fourth electrical RF signal with the fifth electrical RF signal to create the coupled electrical RF signal, performing the second electrophotic conversion operation for the coupled electrical RF signal to create the fourth optical signal, and transmitting the fourth optical signal to the main unit or previous repeater.

13. The multi-drop repeating unit as set forth in claim 12, wherein the forward optical extension module includes:
   a first photoelectric converter for receiving the first optical signal from the main unit or previous repeater and converting the first optical signal into the first electrical RF signal;
   a first splitter for receiving the first electrical RF signal from the first photoelectric converter and splitting the first electrical RF signal into the second electrical RF signal and the third electrical RF signal, the third electrical RF signal being a path to the RF transmission/reception module, the second electrical RF signal being extension path of the splitter;
   a first amplifier for receiving the second electrical RF signal from the extension path of the first splitter and amplifying the second electrical RF signal by a predetermined gain; and
   a first electrophotic converter for receiving the amplified second electrical RF signal from the first amplifier, converting the second electrical RF signal into the second optical signal and transmitting the second optical signal to the next repeater.

14. The multi-drop repeating unit as set forth in 12, wherein the backward optical extension module includes:
   a second photoelectric converter for receiving the third optical signal from the next repeater and converting the third optical signal into the fourth electrical RF signal;
   a second amplifier for receiving the fourth electrical RF signal from the second photoelectric converter and amplifying the fourth electrical RF signal by a predetermined gain;
   a second coupler for coupling the amplified fourth electrical RF signal from the second amplifier with the fifth electrical RF signal from the RF transmission/reception module; and
   a second electrophotic converter for receiving the coupled electrical RF signal from the second coupler, converting the coupled electrical RF signal into the fourth optical signal and transmitting the fourth optical signal to the main unit or previous repeater.

15. The multi-drop repeating unit as set forth in claim 10, wherein the repeaters each include:
   an optical extension module for, in the forward mode, receiving the first optical signal from the main unit or previous repeater, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal, and transmitting the second optical signal to the next repeater, and for, in the backward mode, receiving the third optical signal from the next repeater, performing the second photoelectric conversion operation for the third optical signal to create the fourth electrical RF signal, amplifying the fourth electrical RF signal, receiving the fifth electrical RF signal from RF transmission/reception module, coupling the amplified fourth electrical RF signal with the fifth electrical RF signal to create the coupled electrical RF signal, performing the second electrophotic conversion operation for the coupled electrical RF signal to create the fourth optical signal, and transmitting the fourth optical signal to the main unit or previous repeater, the optical extension module bypassing both the first optical signal received in the forward mode and the third optical signal received in the backward mode in response to a bypass control signal generated due to the interruption of power supply;
   the RF transmission/reception module for radiating the third electrical RF signal from the optical extension module to the associated terminal, receiving the fifth electrical RF signal from the associated terminal and transferring the fifth electrical RF signal to the optical extension module;
   a power supply for supplying power to the optical extension module and RF transmission/reception module; and
   a controller for monitoring states of the optical extension module, RF transmission/reception module and power supply, generating alarm to the main unit if a fault occurs during the state monitoring, and controlling the modules in response to at least one control signal from the main unit, the controller generating the bypass control signal to the optical extension module upon the interruption of power supply.

16. The multi-drop repeating unit as set forth in claim 15, wherein the optical extension module includes:
   a forward optical extension module for receiving the first optical signal from the main unit or previous repeater, performing the first photoelectric conversion operation for the first optical signal to create the first electrical RF signal, splitting the first electrical RF signal into the second electrical RF signal and the third electrical RF signal, amplifying the second electrical RF signal, performing the first electrophotic conversion operation for the amplified second electrical RF signal to create the second optical signal and transmitting the second optical signal to the next repeater, the forward optical extension module bypassing the first optical signal to the next repeater in response to the bypass control signal from the controller upon the interruption of power supply or automatically upon the interruption of power supply; and
   a backward optical extension module for receiving the third optical signal from the next repeater, performing the second photoelectric conversion operation for the third optical signal to create the fourth electrical RF signal, amplifying the fourth electrical RF signal, receiving the fifth electrical RF signal from the RF transmission/reception module, coupling the amplified fourth electrical RF signal with the fifth electrical RF signal to create the coupled electrical RF signal, performing the second electrophotic conversion operation for the coupled electrical RF signal to create the fourth optical signal and transmitting the fourth optical signal to the main unit or previous repeater, the backward optical extension module bypassing the third optical signal to the main unit or previous repeater in response to the bypass control signal from the controller upon the interruption of power supply.

17. The multi-drop repeating unit as set forth in claim 16, wherein the forward optical extension module includes:
   a first photoelectric converter for receiving the first optical signal from the main unit or previous repeater and converting the first optical signal into the first electrical RF signal;

a first splitter for receiving the first electrical RF signal from the first photoelectric converter and splitting the first electrical RF signal into the second electrical RF signal and the third electrical RF signal, the third electrical RF signal being a path to the RF transmission/reception module, the second electrical RF signal being an extension path of the splitter;

a first amplifier for receiving the second electrical RF signal from the extension path of the first splitter and amplifying the second electrical RF signal by a predetermined gain; electrophotic converter for receiving the amplified second electrical RF signal from the amplifier, converting the second electrical RF signal into the second optical signal and transmitting the second optical signal to the next repeater;

a first electrophotic converter for receiving the second electrical RF signal from the first amplifier, converting the second electrical RF signal into the second optical signal and transmitting the second optical signal to the next remote unit; and a first set of first and second optical switches connected respectively to a signal input terminal of the first photoelectric converter and a signal output terminal of the first electrophotic converter, the first set of first and second optical switches performing a switching operation in a normal condition to pass the first optical signal from the main unit or previous repeater through the first photoelectric converter, first splitter, first amplifier and first electrophotic converter, and bypassing the first optical signal from the main unit or previous repeater to the next repeater in response to the bypass control signal from the controller.

18. The multi-drop repeating unit as set forth in claim 16, wherein the backward optical extension module includes:

a second photoelectric converter for receiving the third optical signal from the next repeater and converting the third optical signal into the fourth electrical RF signal;

a second amplifier for receiving the fourth electrical RF signal from the second photoelectric converter and amplifying the fourth electrical RF signal by a predetermined gain;

a second coupler for coupling the amplified fourth electrical RF signal from the second amplifier with the fifth electrical RF signal from the RF transmissionlreception module to create the coupled electrical RF signal;

a second electrophotic converter for receiving the coupled electrical RF signal from the second coupler, converting the coupled electrical RF signal into the fourth optical signal and transmitting the fourth optical signal to the main unit or previous repeater; and a second set of first and second optical switches connected respectively to a signal input terminal of the second photoelectric converter and a signal output terminal of the second electrophotic converter, the second set of first and second optical switches performing a switching operation in a normal condition to pass the third optical signal from the next repeater through the second photoelectric converter, second amplifier, second coupler and second electrophotic converter, and bypassing the third optical signal from the next repeater to the main unit or previous repeater in response to the bypass control signal from the controller.

* * * * *

UNITED STATES PATENT AND TRADEMARK OFFICE
CERTIFICATE OF CORRECTION

| | | |
|---|---|---|
| PATENT NO. | : 7,221,906 B2 | Page 1 of 1 |
| APPLICATION NO. | : 10/400013 | |
| DATED | : May 22, 2007 | |
| INVENTOR(S) | : Sang Hoon Lim et al. | |

It is certified that error appears in the above-identified patent and that said Letters Patent is hereby corrected as shown below:

In claim 8, Column 14, line 41, please delete "the the" and substitute -- the --.

In claim 10, Column 15, line 31, please add -- analog -- before the word "optical".

In claim 10, Column 15, line 35, please add -- an analog -- before the word "RF".

In claim 10, Column 15, line 36, please add -- an -- before the word "optical".

In claim 10, Column 15, line 53, please add -- an -- before the word "associated".

In claim 11, Column 16, line 42, please add -- an -- before the word "alarm".

In claim 13, Column 17, line 17, please add -- an -- before the word "extension".

In claim 14, Column 17, line 43, please add -- analog -- before the word "optical".

In claim 15, Column 17, line 63, please add -- an -- before the word "RF".

In claim 15, Column 18, line 20, please add -- an -- before the word "alarm".

In claim 17, Column 19, line 11, please add -- an -- before the word "electrophotic".

In claim 18, Column 20, line 5, please add -- analog -- before the word "optical".

Signed and Sealed this

Twenty-seventh Day of November, 2007

JON W. DUDAS
*Director of the United States Patent and Trademark Office*